United States Patent
Kegulian

[11] Patent Number: 5,952,113
[45] Date of Patent: *Sep. 14, 1999

[54] MULTI-COLORED CAST JEWELRY

[76] Inventor: Nubar Kegulian, 5146 Los Hermosos Way, Los Angeles, Calif. 90027

[ * ] Notice: This patent issued on a continued prosecution application filed under 37 CFR 1.53(d), and is subject to the twenty year patent term provisions of 35 U.S.C. 154(a)(2).

[21] Appl. No.: 08/512,483

[22] Filed: Aug. 8, 1995

[51] Int. Cl.$^6$ .................................................. B32B 15/00
[52] U.S. Cl. .......................................................... 428/672
[58] Field of Search ................... 164/98, 35, 45, 164/93, 96; 428/614, 670, 672, 673

[56] References Cited

U.S. PATENT DOCUMENTS

| | | | |
|---|---|---|---|
| 2,205,006 | 6/1940 | Eccles | 164/95 |
| 3,461,942 | 8/1969 | Hoffman et al. | 164/96 |
| 3,752,212 | 8/1973 | Thompson | 164/93 |
| 3,847,203 | 11/1974 | Northwood | 164/96 |
| 3,861,454 | 1/1975 | Mezey | 164/93 |
| 4,246,954 | 1/1981 | Cohen et al. | 164/35 |
| 4,891,276 | 1/1990 | Exner | 428/672 |
| 5,000,244 | 3/1991 | Osborne | 164/96 |

FOREIGN PATENT DOCUMENTS

| | | | |
|---|---|---|---|
| 384447 | 4/1908 | France | 164/96 |
| 2041777 | 2/1972 | Germany | 164/96 |
| 53-73420 | 6/1978 | Japan | 164/93 |
| 60-141363 | 7/1985 | Japan | 164/95 |
| 326020 | 3/1972 | U.S.S.R. | 164/93 |
| 426258 | 3/1935 | United Kingdom | 164/96 |

OTHER PUBLICATIONS

A. D. Merriman, A Dictionary of Metallurgy, MacDonald & Evans, Ltd., pp. 112, 116 and 389, 1958.

*Primary Examiner*—John J. Zimmerman
*Attorney, Agent, or Firm*—Christie, Parker & Hale, LLP

[57] ABSTRACT

Multi-colored articles of gold jewelry are cast in one piece by introducing into a casting cavity in a mold, via separate gates from separate sprues and at essentially the same time, separate melts of gold differently alloyed to produce hardened golds of different colors. The melts preferably are of the same gold purity and are alloyed so that the melts have essentially the same density. Novel compositions of green and white gold alloying compositions are described. The articles preferably are cast several at a time in a solid investment casting mold.

2 Claims, 4 Drawing Sheets

MULTI-COLORED CAST JEWELRY

FIELD OF INVENTION

This invention pertains to the casting of unitary articles having different compositions at different locations in the articles. More particularly, it pertains to procedures and equipment for the manufacture of unitary metal articles having such differential composition by use of a single casting operation. Still more particularly, it relates to polychromatic cast gold jewelry and to the methods and devices used to produce it, and to new gold alloying compositions.

BACKGROUND OF THE INVENTION

The present invention relates to gold jewelry and in particular, to the manufacture of unitarily formed articles of jewelry, which as cast are composed of discrete regions of gold of different colors.

The outstanding qualities of gold, including its attractiveness in color and brightness, have made it exceptionally valuable throughout history. For centuries, gold has been used as a decorative ornament in jewelry. Today, jewelry remains the largest single use for gold in all parts of the world. 8 ENCYCLOPEDIA BRITANNICA 273 (15th ed. 1984). Much of the gold used in jewelry is alloyed with another metal or metals. It is well known that different colors of gold can be formed by alloying gold with different metals. (See for example, E. M. Wise, *Gold-Copper-Silver Alloys*, in METALS HANDBOOK 1117 (Taylor Lyman ed. 1948)). Through the use of different alloys, it is possible to produce different gold colored articles of jewelry. More often than not, the articles of jewelry produced are monochromatic. However, the creation of polychromatic gold articles of jewelry is known. These articles are created by, first, producing individual monochromatic gold articles of jewelry, albeit of different colors, and then soldering these monochromatic articles together to create a polychromatic article of gold jewelry.

There are a variety of different processes used to produce jewelry. One such process is casting. The art of casting jewelry is centuries old. In particular, the use of investment casting (the "lost wax" process) to manufacture jewelry is well known. (See for example Sam Tour, *Jewelry Casting*, in METALS HANDBOOK 1098 (Taylor Lyman ed. 1948)). The lost wax process is especially desirable when manufacturing jewelry since it allows for the mass production of complex shapes that are difficult to produce by machining, permits the reproduction of fine detail, and minimizes the amount of hand finishing that is required.

Due to the perpetual popularity of gold in general, and in particular gold jewelry, there will always exist a need for original uses of gold in jewelry and novel processes by which to manufacture this gold jewelry so that the ultimate selection of gold articles of jewelry is continually enhanced, diversified, and improved.

SUMMARY OF THE INVENTION

The present invention responds to the needs described above by providing a new kind of unitarily formed, multi-colored gold jewelry, and by providing procedures and equipment for manufacturing that jewelry by casting melts of different colors of gold. Furthermore, it should be realized that the technology disclosed herein can have application in a variety of fields outside the area of jewelry casting.

The present invention provides a unitarily formed, cast metal article which is comprised of discrete regions of different metal compositions, such that there is a visible difference between the regions of the article as cast. In one embodiment of the invention, the article cast is multi-colored gold jewelry.

The present invention provides two new alloying formulations to be used in combination with gold, so that all of the gold alloy melts introduced into the mold during casting can have the same density.

The present invention also provides a process by which unitary multi-colored gold articles of jewelry can be manufactured. The process, in that and other contexts, comprises the step of introducing into a mold cavity substantially simultaneously melts of metals of different composition via different gates associated with different regions of the article to be cast.

BRIEF DESCRIPTION OF THE DRAWINGS

The foregoing and other advantages and features of the present invention will become apparent from the following detailed description of the invention and presently preferred embodiments thereof; that description is presented with reference to the accompanying drawings, wherein.

DETAILED DESCRIPTION

Figure 1:
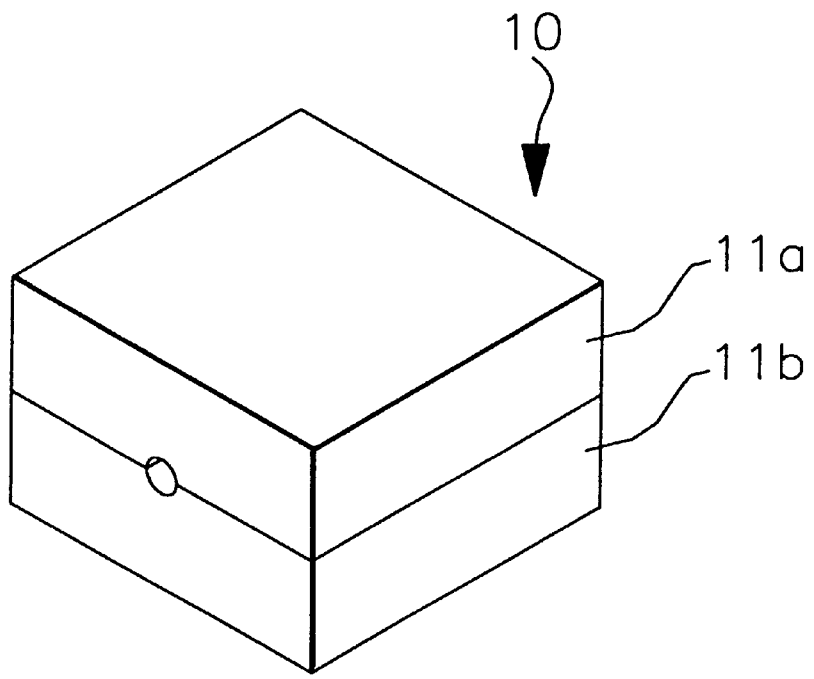
FIG. 1 is a perspective view of a permanent pattern die.
Figure 2:
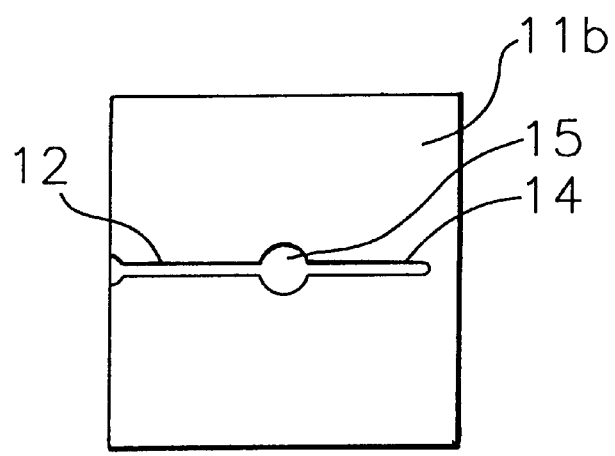
FIG. 2 is a top view of one part of the die shown in FIG. 1 as configured for the casting of an exemplary article according to this invention.

Unitarily formed, multi-colored jewelry is manufactured through an investment casting process, more specifically a solid investment process. Initially, a master pattern, a metal replica of the finished article of jewelry, is created for each style of jewelry desired. Using this master pattern, a permanent pattern die 10 is constructed having two mating parts 11a and 11b. A permanent pattern die is shown in FIG. 1. The two piece die can be formed from any suitable rubber or rubber like material. It is recommended that a harder silicone rubber, rather than a softer rubber material, be used for best uniformity in size and weight of the finished article of jewelry. The permanent pattern die 10 is constructed to include a cavity 15, which is a negative of the master pattern, for the wax pattern and to define attached protogates 12, 14, which are precursors of gate passages defined in the casting flask used to create the cast replica of the master pattern. An example of a pregated pattern die 11b is shown in FIG. 2. Precursors of as much of the flask gating as possible is associated with the pattern cavity 15 in the pattern die to reduce manufacturing costs. The details of shape, configuration and size of the ultimate cast article will vary from article style to article style, and are not aspects of the present invention which is of more fundamental nature. Therefore, the present descriptions of the different aspects of this invention are illustrated, for the most part, by use of a simple article, namely, a sphere for purposes of example.

The wax used for casting the gated patterns in the pattern die is heated to a semi-liquid condition. Wax patterns are prepared by injecting this wax into the pattern die 10. The wax is then allowed to solidify, the pattern die is parted, the pattern is lifted out, and the die is prepared for reuse.

Figure 3:
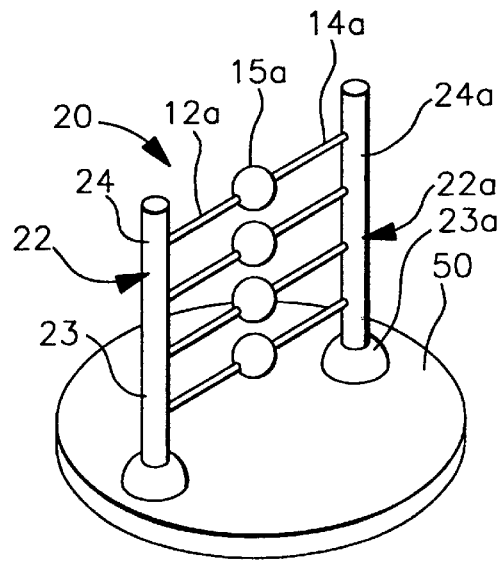
FIG. 3 is a perspective view of a two-sprue wax tree assembly.

After several wax patterns are produced, the patterns with their attached protogates are assembled to form a novel wax tree 20, so that the entire tree assembly can be used to define a single mold for casting. One such wax tree assembly 20 is illustrated in FIG. 3. The use of standardized feeders 22, 22a simplifies the assembly of wax patterns. In one embodiment, the feeders 22, 22a consist prefabricated wax precursors of cylindrical sprues 24, 24a and pouring basins 23, 23a located at the bottom end of the sprues. The sprues are often made from extruded wax bars. If desired, especially where a bi-colored article is to be cast, a feeder system can include runners branched from the respective sprues and to which the pattern protogates are connected. The wax patterns 15a are positioned between and attached to the sprues 24, 24a. Typically, the patterns 15a are attached by wax welding the protogates 12a, 14a to the sprues 24, 24a. The vertical spacing of patterns in a tree assembly and the location of gates depends on the size and volume distribution of the patterns.

Figure 4:
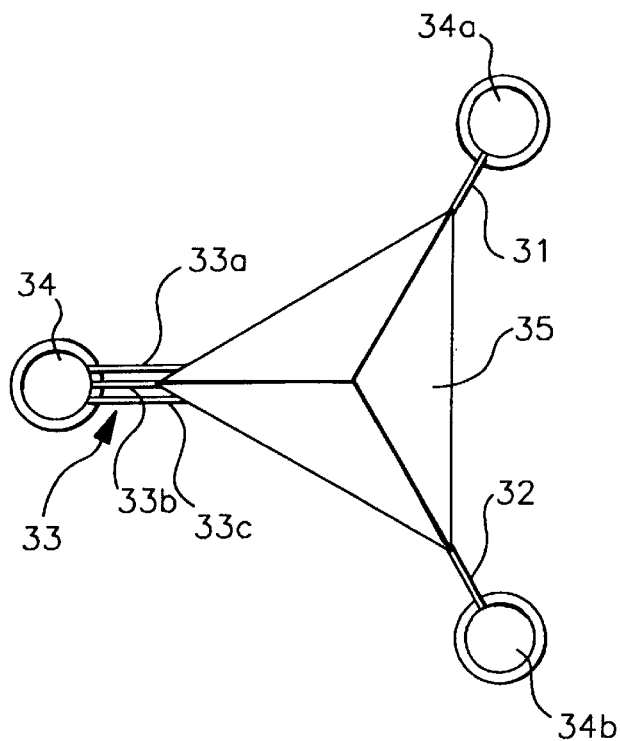
FIG. 4 is a top view of a three-sprue wax tree assembly.

Another novel wax tree 30 is shown in FIG. 4. Wax tree 30 is a three sprue pattern tree assembly created for manufacturing three colored articles of jewelry. The sprues 34, 34a, 34b are similar to the ones described above, and the wax patterns 35 are similarly attached to the sprues 34, 34a, 34b by means of the gates 31, 32, 33. It should be noted that it is not necessary to position the wax patterns 35 in the center of the array of sprues. An article of jewelry comprised predominately of a single color of gold can be created by locating the wax pattern 35 closer to one of the sprues. Additionally, a similar effect can be realized through the use of multiple gates 33a, 33b, 33c at one of the sprues.

The assembled wax tree represents the complete system of cavities and passages that will be present in the casting flask. The assembled wax tree is placed on a base 50 and encircled by a metal flask shell 40 that is open at both ends. The flask shell 40 will retain the mold forming investment material as it solidifies around the wax tree. A slurry of a suitable investment material 39 is poured directly into the flask shell 40, which is subjected to a vacuum to remove any air bubbles near the wax tree. In order to assist in this process, numerous holes 41 are present in the sides of the flask shell 40.

Figure 5:
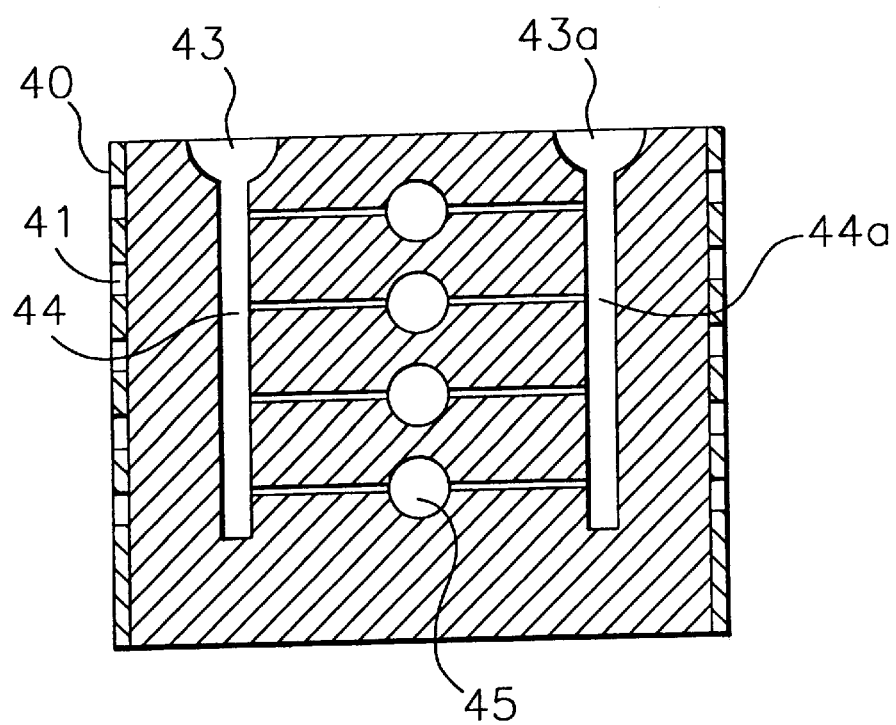
FIG. 5 is a longitudinal cross section view of a casting flask prepared by use of the tree assembly shown in FIG. 2.

Once the investment material 39 has set, the base 50 is removed and the flask is placed into an oven to fire the investment material to a solid state and to melt out the wax, creating a final casting flask as shown in FIG. 5. The flask is typically heated to a temperature on the order of 1150° F., approximately 150° F. higher than normal when a single sprue tree is used in the casting of gold. The higher temperature is important due to the presence of multiple sprues and runners in the flask, allowing a higher than usual flow of air through the flask as a vacuum is drawn in the flask prior to the pouring of the molten gold into the flask. The higher air flow results in a faster cooling rate in the flask. Thus, the higher oven temperature assures that the flask is desirable, such that when pouring of molten gold into the flask occurs, the molten gold will flow freely and into all of the flask cavities without solidifying in the gate passages. Furthermore, the higher oven temperature assures that all of the molten gold delivered to the flask will remain in a molten or near molten state in the cavities until the different melts meet, preventing the formation of cold seams in the finished articles of jewelry.

It has been found that it is important that all of the different melts of gold introduced into the flask have the same density. This is important since meaningful differences in density between the gold melts will cause the heavier gold to fill the lower portion of the flask, or the lower portion of the cavities, during casting. Therefore, two new alloying formulations have been developed, to be used in combination with gold, so that all of the gold alloy melts introduced into the flask will have the same density.

It is well known that different colors of gold can be formed by alloying gold with different metals. Copper alloyed with gold produces red gold. Nickel alloyed with gold produces white gold. Zinc alloyed with gold produces green gold. Often, silver is used with nickel and zinc in creating white and green gold. Heretofore, the densities of the different golds used in the manufacture of multi-colored gold articles of jewelry has been unimportant, except as a reflection of the purity of the gold being used.

In the practice of this invention, red gold, of whatever purity, is used as the base to be matched in density by white and/or green gold of comparable purity. Thus, an aspect of this invention is the creation of green and white alloying compositions which have the same density as copper. Consequently, copper, the green alloying composition, and the white alloying composition can be used in equal parts by weight with gold to produce red, green, and white golds of the same density, regardless of the purity desired, provided that the purities of the different colored golds are the same, e.g. 14 karat.

Assume that a multi-colored gold article of this invention is to be produced in 14 karat gold; the karat rating is a measure of gold purity. Fourteen karat gold contains 14/24 pure gold and 10/24 other metals. Additionally, assume that the article is to be colored red, white, and green. Therefore, 10 parts by weight of copper, white alloying composition, and green alloying composition are each mixed separately with 14 parts by weight of fine gold. The preferred green gold alloying composition ("green metal") is 27% silver, 23% zinc, and 50% copper, by weight. The preferred white gold alloying composition ("white metal") is 15% nickel, 15% zinc, 18.32% silver, and 51.68% copper. Equal amounts, by weight, of copper, white metal, and green metal can be alloyed with gold to produce red, white, and green golds of whatever equal purities are desired.

It is preferred to use 10% by weight of the green metal composition when producing 14 karat red gold. The red gold will melt easier and, when cast, is easier to strip, i.e. to chemically polish.

Figure 7:
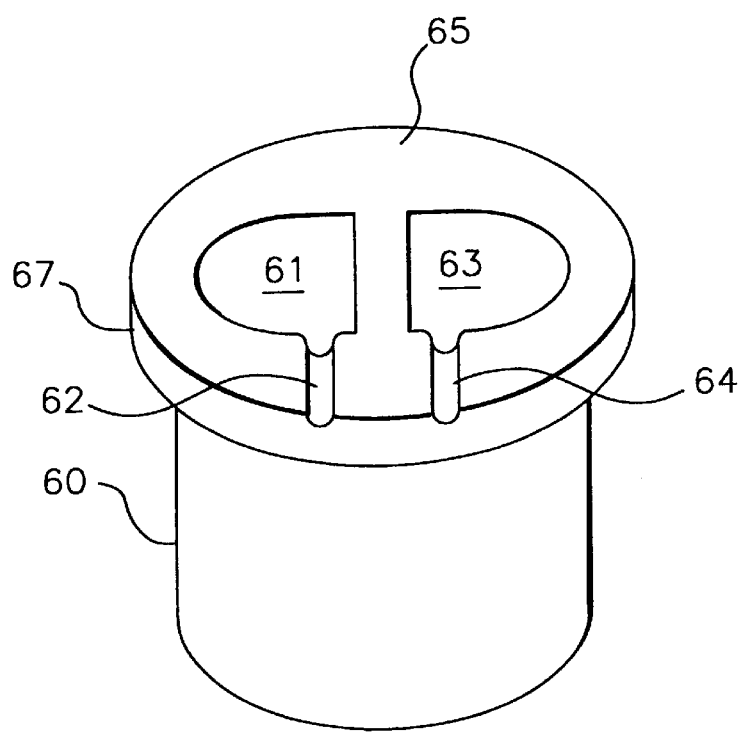
FIG. 7 is a perspective view of a two-cavity crucible.

When manufacturing bi-colored jewelry, it is desirable to use a single two-cavity crucible 60, as shown in FIG. 7. The use of a single two-cavity crucible, as opposed to two single cavity crucibles, increases the likelihood that the different gold alloy melts will be delivered to the respective flask cavities simultaneously. If one gold melt is delivered significantly before the other, there is a possibility that the finished article of jewelry will not be bi-colored, since the pattern cavities 45, or some of them, may be filled with only one color of gold. The crucible 60 is a cylindrical container with two cavities 61, 63 extending vertically down from the top surface 65 into the crucible. Separate pouring channels 62, 64 extend from the cavities 61, 63 at the top surface 65 of the crucible to the same edge of the top surface, to guide the molten gold into the flask 40. The spacing between the pouring channels 62, 64 corresponds to the spacing between the flask pouring basins 43, 43a. Additionally, the upper end of the crucible includes a lip 67 to aid in the handling of the crucible.

It is preferable to start melting the red gold before the other colors used in manufacturing, since the higher copper content in the red gold increases the melting time. Once the red gold is melted in one cavity 61 of the crucible 60, fine gold and the other color alloying composition is placed in the other cavity 63 and is melted. After both of the gold alloys have been melted, the flask 40 is removed from the oven and placed into a casting machine. A variety of different methods can be used for delivering the melts to the flask, including centrifugal casting, which preferably includes a vacuum, and static vacuum casting. Regardless of the type of casting equipment employed, the different gold alloy melts should be delivered to the respective flask sprues 44, 44a simultaneously so that the different alloy melts enter pattern cavities 45 sufficiently simultaneously that they meet each other in these cavities.

Because the several gold alloy melts which enter a casting cavity are essentially the same density, upon meeting, the melts maintain their status as distinct entities and their interfaces are well defined. The melts do not tend to mix, as by convection, and do not tend to stratify by flowing over or under each other. However, because the melts are present in the casting cavities in a molten, or near molten, state for some time, the alloying agents in the different melts can diffuse somewhat across the melt interfaces. The diffusion is not so extensive as to cause the different colors of the finished article to blend imperceptibly into each other and be indistinguishable in the finished article 80 (see FIG. 8).

Figure 6:
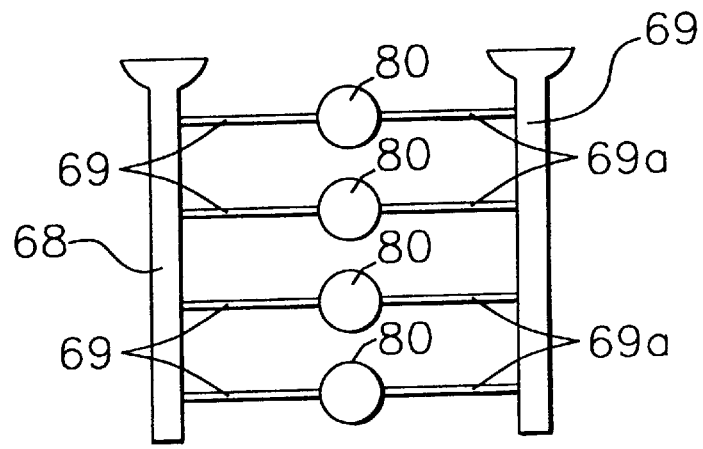
FIG. 6 is an elevation view of a rough casting produced by use of the flask shown in FIG. 5.

When casting is complete, the flask may be allowed to cool until its temperature is approximately 300° F.–400° F. Then the flask 40 is immersed in water, creating a thermal shock in the investment material 39 which causes that material to explode away from the solidified metal, thereby exposing the raw casting, i.e., cast articles of jewelry 80 with the solid sprues 68, 68a and gates 69, 69a attached to them as shown in FIG. 6. The casting preferably is washed with pressurized water to remove any remaining investment material. The Sprues 68, 68a and gates 69, 69a are removed from the cast articles 80. Since the solid sprues and gates are each of a single color of gold, they can be remelted and reused in subsequent casting procedures. A cyanide solution then can be used to strip, i.e. chemically polish the cast articles. Additionally, the cast articles can be mechanically polished as needed before further processing, such as engraving, and sale.

Figure 8:
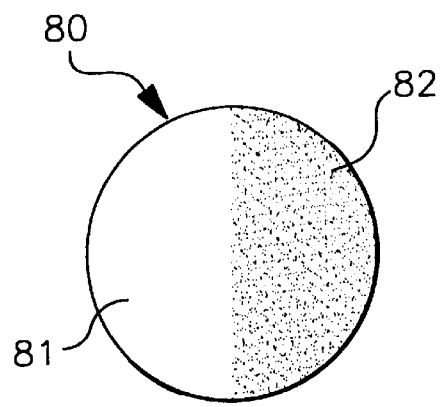
FIG. 8 is perspective view of an exemplary two colored article of jewelry according to the present invention.

The product of the process described above is a unitarily formed, multi-colored article 80 of jewelry, which as cast is comprised of discrete regions 81, 82 of gold of different colors. An example of this product is shown in FIG. 8. The boundaries between the different colors in the finished article of jewelry are neither razor sharp nor imperceptible upon visual inspection.

The foregoing description of presently preferred and other embodiments of the procedural, device and product aspects of this invention is not intended to be and should not be read as an exhaustive exposition and catalog of all ways in which the invention can be practiced. Variations and alterations of the procedures and structures described or illustrated can be adopted without departing from the true and fair scope of the invention.

What is claimed:

1. A unitarily cast article of gold jewelry comprised of discrete yet substantially seamlessly unified plural visible regions of gold alloy of different composition and color as cast, the compositions in the respective regions having essentially equal density and substantially the same degree of gold purity.

2. An article according to claim 1 wherein the the cast article has at least one diffusion boundary between adjacent regions at which the distribution of alloy constituents provides evidence that the alloys in the respective adjacent regions were introduced separately and substantially simultaneously in molten state into a common mold cavity.

* * * * *